Aug. 22, 1939.     H. MOECHEL     2,170,458
LIGHT-WEIGHT GIRDER, ESPECIALLY FOR AIRCRAFT
Filed Aug. 8, 1934     2 Sheets-Sheet 2
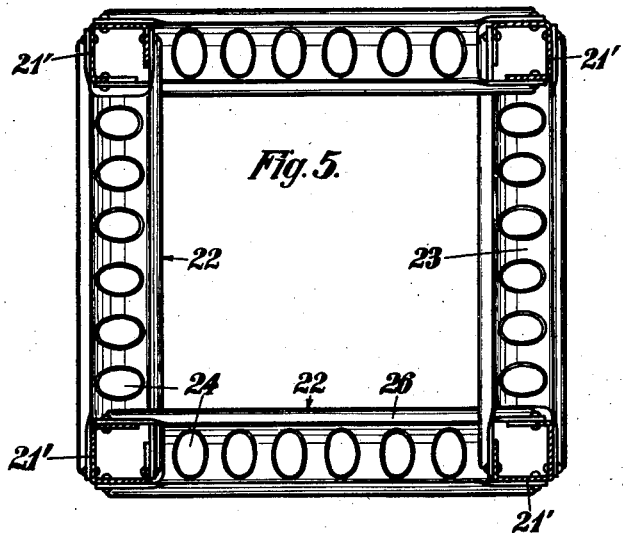
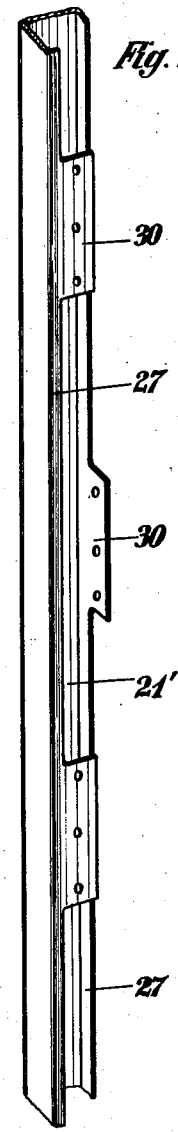
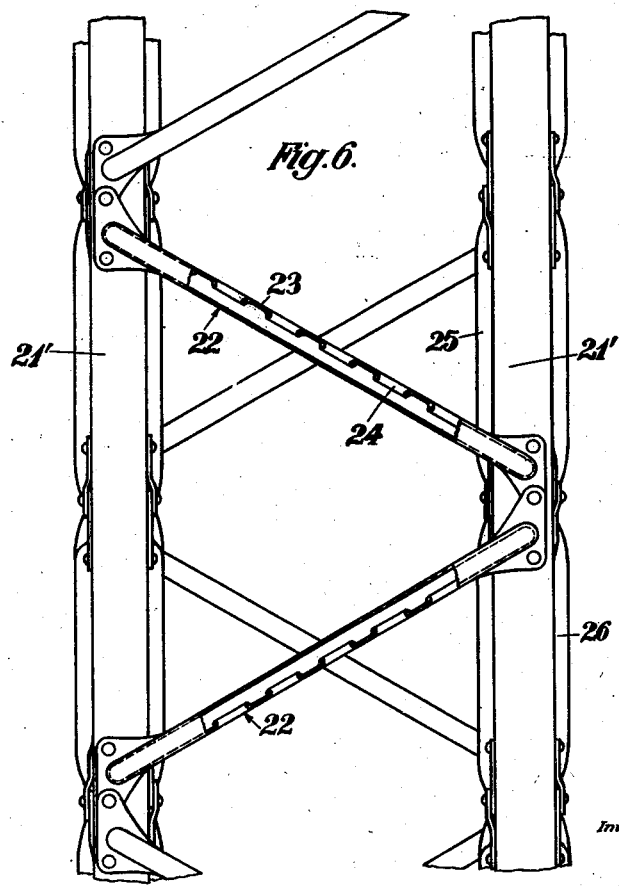

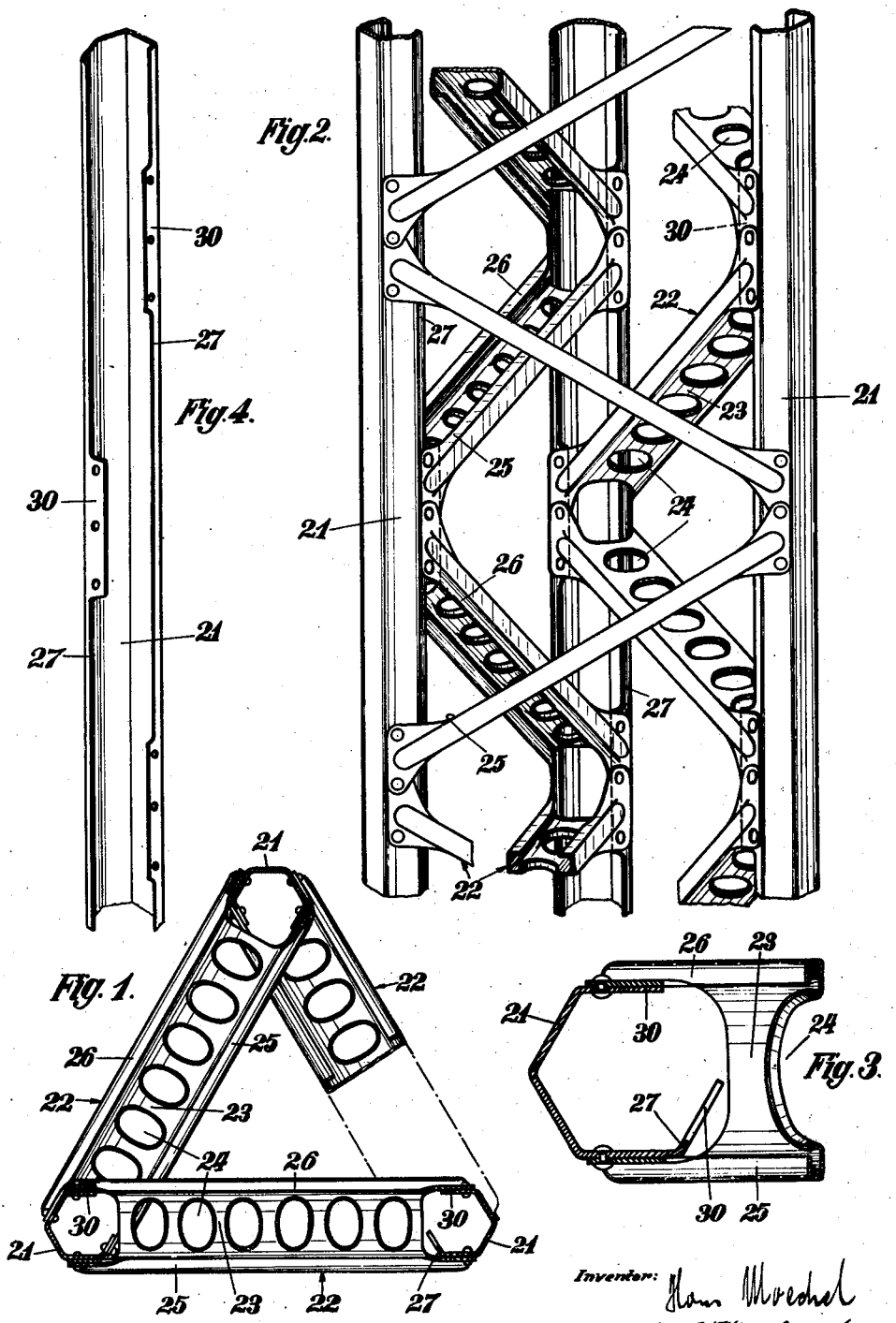

Patented Aug. 22, 1939

2,170,458

UNITED STATES PATENT OFFICE 2,170,458

LIGHT-WEIGHT GIRDER, ESPECIALLY FOR AIRCRAFT

Hans Moechel, Friedrichshafen, Bodensee, Germany, assignor to Luftschiffbau Zeppelin G. m. b. H., Friedrichshafen, Bodensee, Germany Application August 8, 1934, Serial No. 738,995
In Germany August 23, 1933

3 Claims. (Cl. 189—37)

My invention relates to light weight girders especially for aircraft. It has reference to the structure disclosed in the U. S. Patent 1,943,256 and improves the features of the girders shown therein.

The main object of my invention is again reduction in weight of girders of the kind disclosed in the Patent No. 1,943,256, without practically reducing their strength.

Girders according to the prior patent are made up of at least three substantially parallel main chords made from open channels and main braces connecting said channels with one another; the braces again have two chord portions and connecting brace portions; the main chord channels are of substantially polygonal cross section and the chord portions of the main braces are connected to different legs of these channels. Thus generally one of the two chord portions of the main braces is connected to an inner leg of one of the open channels. These inner legs of the channels, according to my invention, are cut away leaving only a small rim or edge over the total length of the channels, for the purpose of stiffening these channels, and leaving further small broader portions, like projecting plates, at the spots where the main braces meet the channels, for connecting them together.

This construction means a great improvement inasmuch as the channels are hardly reduced in their strength and yet their weight becomes considerably lower, which is of greatest importance with light weight constructions such as aircraft.

The invention is best understood when having reference to the drawings which represent two examples embodying my invention.

Fig. 1 is a horizontal sectional view through a girder constructed in accordance with the present invention, Fig. 2 is a fragmentary side elevation of the girder shown in Fig. 1, Fig. 3 is a transverse sectional view through one of the main chord channels and illustrating a portion of a truss brace channel secured thereto, Fig. 4 is a perspective view of a portion of one of the main chord channels, Fig. 5 is a horizontal sectional view through another form of girder embodying the invention, Fig. 6 is a fragmentary side elevation of the structure shown in Fig. 5, and Fig. 7 is a fragmentary perspective view of one of the main chord channels shown in Figures 5 and 6.

In the structure shown in Figures 1 to 4 inclusive, the three main chords or channels are indicated at 21. They are of hexagonal cross section in this case, the sixth side being left away so as to form an open channel. The hexagonal shape has the advantage that the chords 25 and 26 of the braces 22 can directly be connected to respective legs of the channels without bending their end portions.

According to the invention two inner legs of the channel 21 are cut away leaving only a narrow stiffening rim or edge 27 and broader projecting plate portions 30 for fastening the braces 22 to.

The structure shown in Figures 5 to 7 inclusive is analogous to the first one; only in this case the cross section of the girder is rectangular or square and the corner channels 21' in their cross section are of square shape also, so as to facilitate the direct fastening of the chords 25 and 26 of the braces 22 to respective legs of the main chords 21'. Again, according to the invention, the inner legs of the main chords 21' are cut away down to a narrow rim 27 and leaving also portions 30 for riveting or otherwise fastening the braces to.

The braces 22 have the outer edge portions thereof channel-shaped in cross-section, as will be noted particularly in Fig. 3 at 31, and the channel-shaped portions extend substantially the full length of the braces and even overlap the portions of the main chord channels 21, as is clearly illustrated in Figs. 1, 3 and 5. These channel-shaped portions prevent the braces from buckling along the edges of the cord channels and, due to the fact that the channel-shaped portions are outside of the plane of the attaching ears 32 on the braces, the braces can be firmly secured to the chord channels without interference by the channel-shaped portions. This construction is very much stronger than constructions in which the channel-shaped portion stops short of the chord channels 21, as will be obvious from an inspection of the drawings, for there is less chance of buckling at the point where the braces and chord channels meet.

In both examples the braces form again trusses in themselves, as explained in the U. S. Patent No. 1,943,256; they are made of substantially U-shaped channels with holes 24 in their web portions and intermediate brace portions 23 connecting the chords 25 and 26.

Instead of afterwards cutting away the portions not wanted of the inner legs of the main chord channels 21 and 21', respectively, these channels may be adequately shaped before the assembly of the girders, as shown in Figs. 4 and 7, respectively.

I do not want to be limited to the details disclosed or shown in the drawings as many variations will occur to those skilled in the art.

What I claim is:

1. A light weight girder of polygonal cross-section comprising a plurality of main chord channels each having base portions extending at an angle to one another and with side flange portions, the flange portions of said channels being partially cut away at intervals to provide a plurality of spaced ears, the ears on each of said chord channels being staggered with respect to one another; and a plurality of truss brace channels each having base and flange portions, the base portions of said truss brace channels being partially cut away adjacent to the ends thereof to provide spaced parallel projections, the projections on the opposite ends of one of the flanges of each of said truss brace channels being connected to the ears of adjacent chord channels and the projections on the opposite ends of the other flange of each of said truss brace channels being connected to the base portions of the same adjacent chord channels.

2. A light weight girder of polygonal cross-section comprising a plurality of main chord channels each having base portions extending at an angle to one another and with side flange portions, the flange portions of said channels being partially cut away at intervals to provide a plurality of spaced ears, the ears on each of said chord channels being staggered with respect to one another longitudinally of the channel, pairs of ears on adjacent channels which are to be connected by truss braces being spaced from each other longitudinally of the girder; and a plurality of truss brace channels each having base and flange portions, the base portions of said truss brace channels being partially cut away adjacent to the ends thereof to provide spaced parallel projections disposed in the plane of the flange portions of said truss brace channels throughout their length, the projections on the opposite ends of one of the flanges of each of said truss brace channels being connected to the ears of adjacent chord channels and the projections on the opposite ends of the other flange of each of said truss brace channels being connected to the base portions of said adjacent chord channels.

3. A light-weight girder comprising a plurality of main chord channels, a plurality of truss brace channels each having the integral side portions thereof extended to overlie the opposite outer surfaces of said chord channels, said portions having ribs formed thereon extending substantially the entire length of the sides of said brace channels and overlapping to a substantial extent the outer surfaces of said main chord channels whereby to strengthen said portions of said brace channels at the points at which the side portions of said brace channels overlap said main chord channels, and means for connecting overlapping portions of said main chord and brace channels at least on opposite sides of the portion of the rib which overlaps the main chord channel, the said rib extending at least to a point on a line passing through said connecting means, and the web portions of said brace channels being cut away adjacent the ends thereof to receive the adjacent portions of the chord channels.

HANS MOECHEL.